United States Patent [19]

Miura et al.

[11] Patent Number: 4,533,383
[45] Date of Patent: Aug. 6, 1985

[54] DEVICE AND METHOD FOR MAKING AND COLLECTING FINE ALLOY POWDER

[75] Inventors: Hirohisa Miura; Hiroshi Sato; Toshio Natsume; Hidenori Katagiri, all of Aichi, Japan

[73] Assignee: Toyota Jidosha Kabushiki Kaisha, Toyota, Japan

[21] Appl. No.: 608,168

[22] Filed: May 8, 1983

[30] Foreign Application Priority Data

May 10, 1984 [JP] Japan ................... 58-081538

[51] Int. Cl.³ ............................... B22F 9/00
[52] U.S. Cl. ........................ 75/0.5 C; 266/200; 266/207
[58] Field of Search ......... 75/0.5 C, 0.5 B, 0.5 BA, 75/0.5 BB, 0.5 BC; 266/200, 207; 264/13

[56] References Cited

U.S. PATENT DOCUMENTS

4,191,556 3/1980 Rothblatt .................. 75/0.5 B
4,484,943 11/1984 Miura et al. ............... 75/0.5 C Primary Examiner—Wayland Stallard
Attorney, Agent, or Firm—Oblon, Fisher, Spivak, McClelland & Maier

[57] ABSTRACT

Fine powder of an alloy of two or more metals is made by vaporizing each of these metals in its own vaporization chamber, mixing each of the metallic vapors with an inert carrier gas, and then adiabatically expanding each of the mixture gases through its own nozzle, which preferably is a convergent-divergent nozzle. Jet flows from the nozzles are collided together, after having been very rapidly cooled by this adiabatic expansion, and thereby the metal vapors in the jet flows are quickly condensed into very fine alloy particles. Optionally the combined flows from the jets are directed against an alloy powder collecting means, which may be a collection plate, but preferably is a bath of oil which entrains the alloy particles and keeps them from agglomerating together by partially neutralizing their surface activity. Thus fine alloy powder with particle diameters of the order of a few hundreds of angstroms can be economically produced.

14 Claims, 4 Drawing Figures

DEVICE AND METHOD FOR MAKING AND COLLECTING FINE ALLOY POWDER

BACKGROUND OF THE INVENTION

The present invention relates to an apparatus and to a method for making fine powder of an alloy of two or more metals, and more particularly relates to such an apparatus and method for making alloy powder of two or more metals, of which the diameters of the alloy powder particles are on the order of some few hundreds of angstroms.

The present invention was orignally made in Japan, and the first patent application made therefor was Japanese Patent Application No. 81538/83, of which priority is being claimed in the present application; and the subject matter of that previous Japanese patent application is hereby incorporated into this specification by reference; a copy is appended to this specification.

Prior art methods of manufacturing fine powder, both of pure metals and of alloys of two or more metals, such as the type of fine pure metal or alloy powder used for sintering material and as dispersion material for making particle dispersion composite materials, have generally involved mechanically pulverizing solid masses of pure metal or alloy material, atomizing molten pure metal or alloy material, or colliding a stream of molten pure metal or alloy material with an object at low temperature; but the diameters of the particles of pure metal or alloy powder made by such prior art methods as above have typically been of the order of from ten to five hundred microns.

In general, the smaller are the diameters of the particles of a fine pure metal or alloy powder, the better is the pure metal or alloy powder for use as raw material for sintering or for making particle dispersion composite materials, because, due to and according to the increase in the total surface area of the particles of the metal or alloy powder relative to their total weight, in the case of sintering the higher the density of the resultant sintered material becomes, whereas in the case of making a particle dispersion composite material the better the mechanical properties of the composite material become, due to the relative increase in the importance of the forces due to their surface activity to the forces due to their mass. Therefore, it has been realized for a long time that it is very desirable to make fine pure metal or alloy powder with as small a particle diameter as possible, and many laborious studies have been conducted with this aim in view.

One method that has been experimented with for making very fine metal particles has been the vacuum vapor deposition method. In this method, a metal is heated in vacuum and is vaporized into vapor of its gas, and this metal vapor gas is then condensed on the surface of a low temperature object, i.e. a collector. Another method that has been attempted involves vaporizing a metal in a low pressure but not vacuum environment made up of an inert gas at a pressure of from a tenth to a hundredth of atmospheric pressure or thereabouts, so that the vapor of the metal is cooled by the inert gas so much as to be brought into the oversaturated state. Thus this metal vapor condenses into fine powder in either the liquid or the solid phase. This method, called the gas vaporization method, has been successful for producing small amounts of fine alloy powder on an experimental basis.

These methods have been successful in making fine metallic powder with average particle diameter less than one micron, but, since all of these methods make use of various gradual vapor condensation phenomena, there have inevitably been large fluctuations in the particle diameters of the alloy powder obtained (i.e. the standard deviation of these diameters has been great), and furthermore the rate of production of alloy powder has been extremely low. In order to improve the productivity of these methods, it appears to be necessary continuously to take out the generated metal vapor from the chamber in which it is generated, and to cool it. Therefore, there have been proposed methods in which the metal vapor is carried on a plasma flow to take it out of the metallic vapor production chamber, and is then cooled by striking it or colliding it against a collection plate, which may be a water cooled copper plate. Also, methods have been proposed in which the metal vapor is absorbed into a sheet of oil which is dripping down along a bearing member or the like, and again the metal vapor is condensed in this way. However, the former method involving the use of a plate for condensing the metal vapor requires large and expensive facilities, while the latter method of absorption into oil is not high in absorption effiency. Accordingly, up till the present date, it has been practically very difficult to mass produce fine alloy powder with very small and uniform particle diameter in an efficient and economical way.

A subsidiary troublesome problem that has occurred in the manufacture of fine pure metal or alloy powder is that, when the particle diameters are very small and when the powder is manufactured in vacuum conditions or in an inert gas atmosphere, the powder can have a tendency towards self ignition when it is removed and is brought into contact with the ordinary atmosphere, even at room temperature. This is because, as the particle diameter decreases, the surface area of the particles included in a given mass of alloy powder increases dramatically, and therefore the chemical activity of the particles increases. Therefore, in the prior art, it has been recognized to be desirable to perform post processing on fine alloy powder before removing it into the atmosphere from vacuum or an inert atmosphere where it has been formed, by forming under controlled conditions an oxide film on the surfaces of the particles. However, according to such conventional methods, this has increased the cost of the process, and has also lowered the quality of the finished product and its effectiveness for use as a sintering material or a particle dispersion material.

In a copending patent application Ser. No. 608,167, invented by the same inventors as the present application and assigned to the same assignee, which it is not intended hereby to acknowledge as prior art except insofar as constrained to do so by law, there were proposed a method for making fine powder of a metal, comprising the steps of: producing vapor of said metal; mixing a flow of inert gas with said vapor of said metal to produce a mixture gas; rapidly cooling said mixture gas by adiabatically expanding it by passing it through a nozzle; and collecting metal powder fromm a flow out from said nozzle; and a device for practicing the method, comprising: a vaporization chamber for producing metal vapor therein; means for heating said vaporization chamber; means for introducing a flow of inert gas into said vaporization chamber; an exit flow path from said vaporization chamber, comprising a nozzle therealong; a powder collection zone into which the flow out from said nozzle is directed; and means for evacuating gases from said powder collection zone. Thus, the present inventors discovered that, in the case of manufacturing fine powder of a pure metal according to that proposal, if as specified above the generated metal vapor is brought out from the zone in which it is made by directing it through a nozzle, then the rapid adiabatic expansion cooling provided to the metal vapor as it passes through the nozzle is very effective for causing the metal vapor to condense into extremely minute particles. Further, the present inventors discovered that, by mixing in a quantity of inert gas such as argon or helium for use as a carrier gas with this metal vapor, before passing the mixture through the nozzle for adiabatic expansion cooling, thereby the metal vapor can be introduced into the nozzle all the more quickly, and since thus the growth in the size of the metal particles resulting from the conglomeration together thereof is restricted, fine metal powder with even more even and consistent particle diameters can be made even more efficiently. Further, with the addition of this carrier gas, the adjustment of the temperature and pressure conditions before and after the nozzle can be made with very great facility, by controlling the flow rate of this inert gas, and hence the particle diameter of the resulting fine metal powder can be easily and closely controlled. Thus, since the metal vapor is prevented by the inert gas from undergoing particle growth through agglomeration, metal vapor is quickly and continuously and smoothly introduced into the nozzle as carried by the inert gas, and thus it is quite practicable to make metal powder with particle diameter of a few hundred angstroms or so in quantity.

Figure 1:
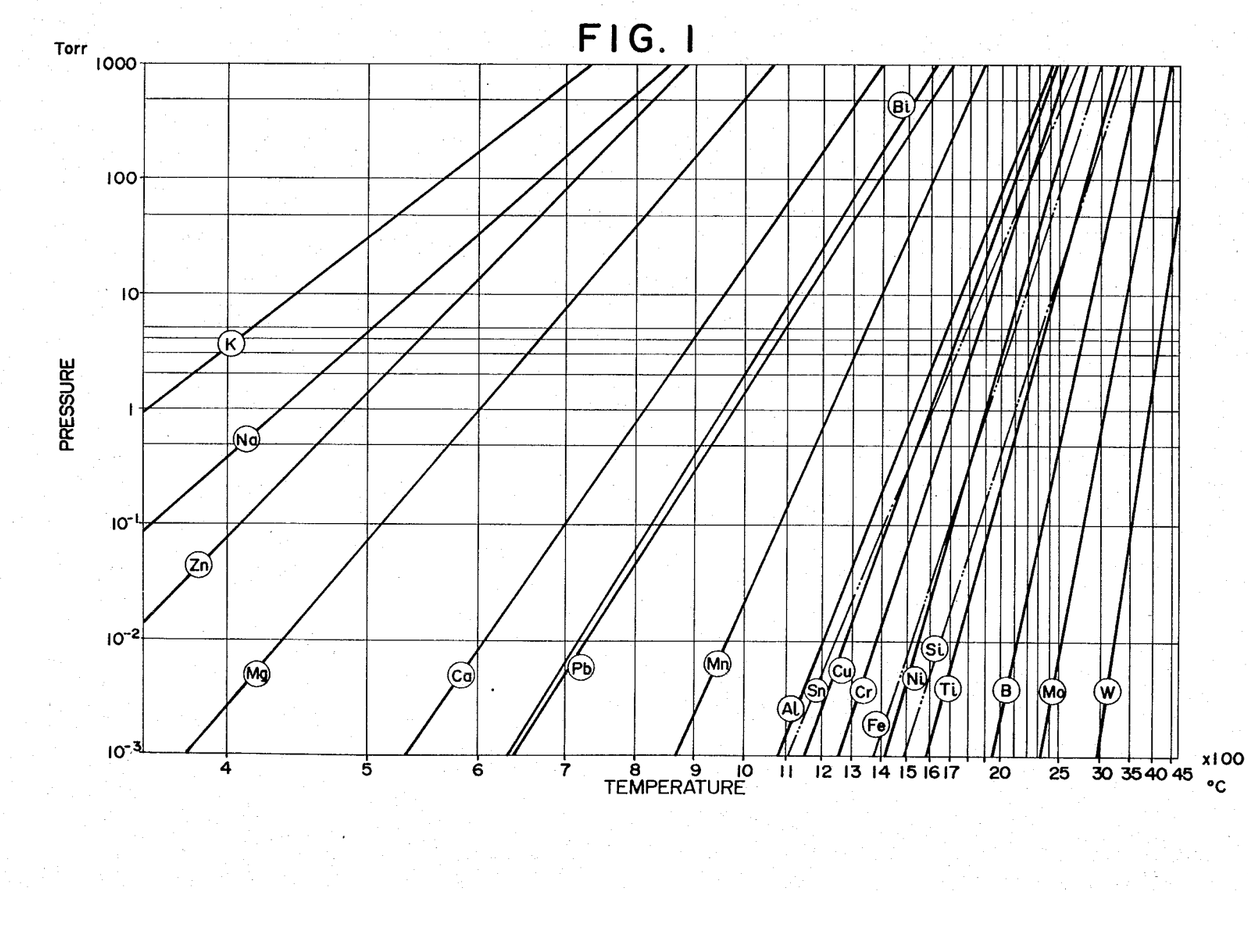
FIG. 1 is a chart showing the vapor pressures of various metals represented on a logarithmic scale along the vertical direction, plotted against temperature as represented on a logarithmic scale along the horizontal direction.

Now, the above problems are relevant both to the manufacture of fine powder of a pure metal and fine powder of an alloy of more than one metal; but in practice the method and device of the proposal mentioned above are not suitable for making powder of an alloy of two or more metals. FIG. 1 of the appended drawings, in which the vapor pressures of various metals are shown on a logarithmic scale along the vertical direction, and temperature is shown on a logarithmic scale along the horizontal direction, illustrates that the vapor pressures of different metals drastically differ at the same temperature. For example, at 1800° C. the vapor pressures of Al, Cu, and Ni are respectively 12 torr, 5.6 torr, and 0.3 torr. Also, the boiling points of different metals differ widely. Therefore, if in an attempt to apply the method and device of the proposal mentioned above to manufacture of, for example, fine alloy powder consisting of an alloy of aluminum and nickel, a mixture of aluminum and nickel were charged into the vaporization chamber and were heated, this would result in the evolution of first substantially only aluminum vapor, then a mixture of a lot of aluminum vapor and only a little nickel vapor, and then as the temperature rose and the aluminum became vaporized away from the percentage of nickel vapor would rise until the evolved vapor was substantially only nickel vapor; and a mixture vapor of aluminum vapor and nickel vapor of substantially the same proportional composition as the amounts of these metals charged into the vaporization chamber at the beginning would not be produced for any substantial time. Hence alloy powder of aluminum and nickel would not be satisfactorily produced with a consistent composition. Even if this could be managed somehow, as for example by constant addition of more of aluminum or nickel, the proportions of aluminum and of nickel in the produced alloy powder particles could not freely be determined at will according to the desired use of the fine alloy powder; but the vapor pressures of the aluminum and the nickel would exercise much undesirable constraint thereover.

Further, since in practice the actual demand for fine alloy powder made up of two or more metals is much greater than the demand for fine powder made of a single pure metal, due to the well known fact that in an alloy each constituent can supply deficiencies of others, this problem is a very important one, and a solution is very much needed.

SUMMARY OF THE INVENTION

In view of the above detailed problems inherent in the prior art methods of making fine alloy powder and in the application of the method and device of the identified copending patent application thereto, the present inventors sought to find other ways of making fine alloy powder, and performed many experimental researches in this connection.

Accordingly, it is the primary object of the present invention to provide a method for making fine alloy powder, and a device for practicing the method, which can efficiently and effectively manufacture alloy powder in reasonable amounts.

It is a further object of the present invention to provide such a device and method for making alloy powder, which can manufacture extremely fine alloy powder with very small particle diameter.

It is a further object of the present invention to provide such a device and method for making alloy powder, which can manufacture fine alloy powder of very uniform particle diameter.

It is a further object of the present invention to provide such a device and method for making alloy powder, which can manufacture fine alloy powder of an alloy of two or more metals which have different vapor pressures.

It is a further object of the present invention to provide such a device and method for making alloy powder, which can manufacture fine alloy powder of an alloy of two or more metals which have different vapor pressures, with the proportions of the metals in the produced alloy particles being selectable as desired without regard for their vapor pressures.

It is a yet further object of the present invention to provide such a device and method for making alloy powder, which can avoid any self ignition of the alloy powder, when it is introduced into the ordinary atmosphere.

According to the most general aspect of the present invention, these and other objects are accomplished by a device for making fine alloy powder, comprising: a first vaporization chamber for producing vapor of a first metal in; first heating means for heating said first vaporization chamber; means for introducing a flow of inert gas into said first vaporization chamber; a first exit flow path from said first vaporization chamber, comprising a first nozzle therealong; a second vaporization chamber for producing vapor of a second metal in; second heating means for heating said second vaporization chamber; means for introducing a flow of inert gas into said second vaporization chamber; a second exit flow path from said second vaporization chamber, comprising a second nozzle therealong; and a powder collection zone into which the flows out from said first and said second nozzles are directed, said first and said second nozzles being so positioned that said flows out from them collide and combine in said powder collection zone; and means for evacuating gases from said powder collection zone; and by a method for making fine powder of an alloy of a first metal and a second metal, comprising the steps of: producing vapor of said first metal; mixing a flow of inert gas with said vapor of said first metal to produce a first mixture gas; rapidly cooling said first mixture gas by adiabatically expanding it by passing it through a first nozzle; producing vapor of said second metal; mixing a flow of inert gas with said vapor of said second metal to produce a second mixture gas; rapidly cooling said second mixture gas by adiabatically expanding it by passing it through a second nozzle; colliding together output flows from said first nozzle and said second nozzle to produce a combined flow; and collecting alloy powder from said combined flow.

As a result of the various experimental researches made by the present inventors, they have discovered that, if as specified above and according to the present invention the generated metal vapors in the first and the second vaporization chambers are brought out from the zone in which they are made by directing them through the first and second nozzles, the jet flows from the nozzles then being collided together, then the rapid adiabatic expansion cooling provided to these metal vapors as they pass through said first and second nozzles is very effective for causing the metal vapors to condense into extremely minute particles. However, the inventors also have discovered that the resultant fine particles consist of a well mixed alloy of the metals, and in fact it seems that the particles remain in at least the liquid form up to the time that they reach the collision zone between the jet flows from the first and second nozzles—although this cannot be experimentally verified in practice. Further, the present inventors discovered that by mixing a quantity of inert gas such as argon or helium, for use as a carrier gas, with these metal vapors in the first and second vaporization chambers, before passing the mixtures through the first and second nozzles for adiabatic expansion cooling, the growth in the size of the resultant particles resulting from the conglomeration together thereof is restricted, and fine alloy powder with more even and consistent particle diameters can be made more efficiently. Further, with the addition of this carrier gas, the adjustment of the temperature and pressure conditions before and after the nozzles can be made with very great facility, by controlling the flow rates of this inert gas into the first and the second vaporization chambers, and hence the particle diameter of the resulting fine alloy powder can be easily and closely controlled. Also, the adjustment of the proportions of the first and second metals in the resultant alloy particles can be performed even more freely, since the proportions of the inert gas in each of the nozzle flows can be varied quite freely.

Thus, the metal vapors are prevented by the inert gas from undergoing particle growth through agglomeration, and are continuously and smoothly introduced into the nozzles as carried by the inert gas flows. Thus it is quite practicable to make alloy powder with particle diameter of a few hundred angstroms or so in quantity. Further, the present inventors conceived the concept of catching the fine alloy powder particles in the combined flow from the jet flows squirting out from the first and second nozzles in a bath of oil located just under the collision zone of the flows. This oil should be a type of oil which has good fluidity but does not substantially become deteriorated or volatilized in a vacuum, such as vacuum oil or electrical insulation oil. By such a method, the fine alloy powder particles which have just been formed in the collision zone are immediately entrained into the oil, and the oil effectively neutralizes their surface activity while at the same time preventing them from agglomerating together. Since thereafter the fine alloy powder particles exist within the oil in the mutually isolated state, virtually no later conglomeration of the particles ever takes place, and thus it is possible to make even finer alloy particles in even greater quantity.

The nozzles may be convergent nozzles, or convergent-divergent nozzles. However, the latter were proved to be more effective, in order to effect larger adiabatic expansion cooling of the mixture gas through the nozzles. This increase of the cooling rate of the mixture gases promotes the generation of finer alloy particles and also helps to prevent agglomeration and sticking together of the alloy particles which are being formed, thus helping to promote uniformness of the particle diameters.

The ratio of adiabatic expansion can be best understood from the following. Suppose that the pressure and the temperature of the mixture gas upstream of the nozzle in which adiabatic expansion cooling is performed are $P_1$ (expressed in torr) and $T_1$ (expressed in °K.) and the pressure and temperature of the mixture gas downstream of the nozzle are $P_2$ (again expressed in torr) and $T_2$ (again expressed in °K.), then in the case of a convergent-divergent nozzle the flow speed of the mixture gas passing through the convergent-divergent nozzle is supersonic when the pressure ratio $P_1/P_2$ is greater than or equal to 2.1, and any desired higher acceleration of the mixture gas through the nozzle is available by increasing the pressure ratio, thereby effecting the corresponding larger adiabatic expansion cooling by converting the heat energy of the mixture gas to kinetic energy thereof. When the pressure ratio is relatively small (for instance when $P_1/P_2$ is equal to 2.5), even when it is above said limit ratio so that the downstream speed of the mixture gas is supersonic, the temperature $T_2$ of the gas after passing through the convergent-divergent nozzle is relatively high, and, when the metallic fine powder is to be caught in an oil bath, depending on the kind and the temperature of the oil to be used, there is a danger that part of the oil may burn or evaporate. Thus, it is preferable to keep the pressure ratio $P_1/P_2$ to be equal to or greater than 4.0, preferably equal to or greater than 5.0, and even more preferably equal to 10 or greater, so that the temperature of the mixture gas immediately before colliding with the liquid surface of the oil is lower than the ignition point of the oil. The temperature $T_2$ may be approximately estimated from the following equation, where k is the specific heat ratio of the mixture gas:

$$T_2 = T_1 \times (P_2/P_1)^{(k-1)/k}$$

In the case of a convergent-divergent nozzle, the temperature of the mixture gas can be instantly lowered than the final outlet temperature $T_2$ as estimated by the above equation. On the other hand, in the case of a convergent nozzle, the flow speed of the gas passing through the nozzle is caused to reach the sonic speed by setting the pressure ratio $P_1/P_2$ to be equal to 2.1. It is impossible to raise the flow speed of the mixture gas over the sonic speed in the case of a convergent nozzle, and so the cooling effect and the speed of the metal powder available by a convergent nozzle are correspondingly lower than those available by a convergent-divergent nozzle. However, even in the case of such a convergent nozzle it is possible to achieve a cooling effect which is far greater than that obtained in the conventional gas evaporation method or the like, and so much better results can be obtained in terms of small and uniform particle size of the resulting fine metal powder.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

The present invention will now be described with reference to the preferred embodiments thereof, and with reference to the appended drawings.

EMBODIMENT ONE

Figure 2:
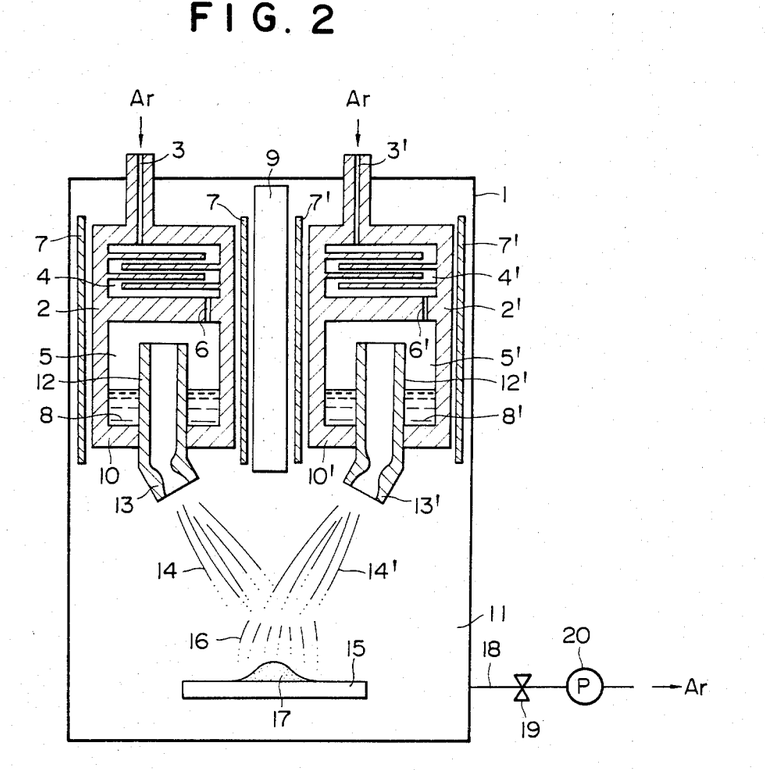
FIG. 2 is a schematic sectional view of an apparatus which is the first preferred embodiment of the device of the present invention, incorporating two convergent-divergent nozzles and an alloy powder collection plate, for making and collecting fine alloy powder according to certain embodiments of the method of the present invention.

FIG. 2 shows a schematic cross section of the first preferred embodiment of the device of the present invention. In this figure, the reference numeral 1 denotes a furnace shell which is formed as a substantially closed container. In the upper part of this furnace shell 1 there are disposed two melting pots 2 and 2′, the upper portions of which are respectively formed with gas preheating chambers 4 and 4′ to which are respectively communicated gas introduction ports 3 and 3′ which are communicated with the outside for introduction of an inert gas such as argon gas, and the lower portions of which are respectively formed with metallic vapor production chambers 5 and 5′ which are communicated via apertures 6 and 6′ with the gas preheating chambers 4 and 4′. Heaters 7 and 7′ are respectively disposed around the melting pots 2 and 2′ for keeping them at predetermined tempratures which will be hereinafter referred to as $T_1$ and $T_1'$, and masses 8 and 8′ of metal charged into the lower parts of the metallic vapor production chambers 5 and 5′ are kept in the molten state by the action of these heaters 7 and 7′ and are, further, boiled so as to emit metallic vapors of the respective metals. A layer 9 of insulating material is disposed between the two melting pots 2 and 2′, so that their temperatures $T_1$ and $T_1'$ do not significantly affect one another and thus can be independently controlled, and also, as will be seen later, the amounts of inert gas introduced through the gas introduction ports 3 and 3′ can be independently controlled, so as to independently control the pressures within the metallic vapor production chambers 5 and 5′, which hereinafter will be designated as $P_1$ and $P_1'$ respectively.

Through the bottom walls 10 and 10′ of the metallic vapor production chambers 5 and 5′ there are respectively fitted conduits 12 and 12′ which lead to an alloy powder collection zone 11, and the upper end of these conduits 12 and 12′ protrudes quite a long way into the chambers 5 and 5′ so as to open to the upper portion of said chambers 5 and 5′. At the bottom end of the conduits 12 and 12′ there are respectively provided nozzles 13 and 13′, which in this first preferred embodiment of the present invention are convergent-divergent nozzles or Laval nozzles, and these nozzles 13 and 13′ open downward into the alloy powder collection zone 11 so as to direct jet flows 14 and 14′ of metal vapor and powder downwards thereinto as will be explained shortly. The nozzles 13 and 13′ are angled obliquely towards one another, i.e. slope together towards the center of the alloy powder collection zone 11, so that the jet flows 14 and 14′ from them impinge against one another, as particularly shown in the figure, to combine into a substantially vertically descending flow 16. In the alloy powder collection zone 11, below this point where the jet flows 14 and 14′ impinge against one another, i.e. approximately midway between the nozzles 13 and 13′ in the horizontal direction, and below them in the figure and displaced from them by a certain distance, there is positioned, in this first preferred embodiment, an alloy powder collection plate 15, which is made of copper and is kept cool by a water cooling system which is not shown in the figure. A pile 17 of fine alloy powder is shown as being collected on this collection plate 15 by collision of the combined flow 16 with said plate 15. A vacuum pump 20 is provided for exhausting the inert gas such as argon gas introduced through the gas introduction ports 3 and 3′ from the alloy powder collection zone 11, via a conduit 18 under the control of a valve 19, so as to maintain the interior of the alloy powder collection zone 11 at a predetermined pressure, which will be hereinafter referred to $P_2$, and so as to maintain the interior of the metallic vapor production chambers 5 and 5′ at their abovementioned predetermined pressures of $P_1$ and $P_2'$.

By using the device for making fine alloy powder shown in FIG. 2 and described above, fine nickel—copper alloy powder was made according to the first preferred embodiment of the method of the present invention, as follows. First, a quantity of approximately 30 gm of metallic copper (99.9% Cu, balance impurities) was charged into the lower part of the metallic vapor production chamber 5 and a quantity of approximately 30 gm of metallic nickel (99.8% Cu, balance impurities) was charged into the lower part of the metallic vapor production chamber 5', and then the temperature of the melting pot 2 and the chambers 4 and 5 defined therein was rapidly raised to a temperature $T_1$ of approximately 1650° C. by operating the heater 7 and the temperature of the melting pot 2' and the chambers 4' and 5' defined therein was rapidly raised to a temperature $T_1'$ of approximately 2000° C. by operating the heater 7', while steady flows of argon gas were introduced through the gas introduction ports 3 and 3'. Thus the copper and the nickel in the metallic vapor production chambers 5 and 5' were melted, and were further steadily boiled to produce copper vapor and nickel vapor respectively in the chambers 5 and 5', these copper and nickel vapors mixing with the argon gas flowing into said chambers 5 and 5'. The mixture gases thus produced (in which the inert argon gas functioned as a carrier gas) then entered the upper ends of the conduits 12 and 12' respectively, and passed down through said conduits 12 and 12', to pass through the convergent-divergent nozzles 13 and 13' respectively and each to be cooled at a very high rate by adiabatic expansion cooling caused by this expansion process, to respective estimated temperatures $T_2$ and $T_2'$ of respectively about 500° to 590° C. and about 640° to 860° C. The jet flows 14 and 14' expelled from the outlets of the convergent-divergent nozzles 13 and 13' squirted into the alloy powder collection zone 11 and impinged together to form a combined flow 16, which was directed downwards at the alloy powder collection plate 15, which was meanwhile cooled as described above. The vacuum pump 20 was operated at such an appropriate power, the valve 19 was so adjusted, and the flow rate of the argon gas introduced through the gas introduction port 3 was so controlled, as to keep the pressures $P_1$ and $P_1'$ within the metallic vapor production chambers 5 and 5' both at approximately 10 torr, and the pressure $P_2$ within the alloy powder collection zone 11 at approximately 1 to 2 torr. Further, in this first embodiment, the distances from the outlets of the convergent-divergent nozzles 13 and 13' to the central point of the zone at which the jet flows 14 and 14' therefrom collided were both about 15 cm, and the distance from this central collision point to the surface of the collection plate 15 was about 5 cm.

During this process, the copper vapor and the nickel vapor in the mixture gas flows were condensed by this adiabatic expansion cooling, as being conjectured first into the liquid phase and then into the solid phase although this cannot be directly established, in the nozzles 13 and 13', in the jet flows 14 and 14', and in and around the zone 16, to form very fine nickel—copper alloy powder, and this alloy powder was then steadily collected in a pile on the collection plate 15 as shown by 17, by colliding with said plate 15 along with the inert argon carrier gas, which was of course exhausted by the pump 20. The total time used for processing all the total of 30 gm of nickel and copper charged into the chambers 5 and 5' was about 17 minutes, and the range of the diameters of the particles of fine nickel—copper alloy powder produced was from about 110 to about 300 angstroms, while the average particle diameter was about 160 angstroms. Thus, it was found that fine nickel—copper alloy powder with particle diameters very much smaller than those attainable in practice by conventional methods was efficiently and practicably produced, according to this first embodiment of the method of the present invention, by using the device shown.

MODIFICATION ONE

Figure 4:
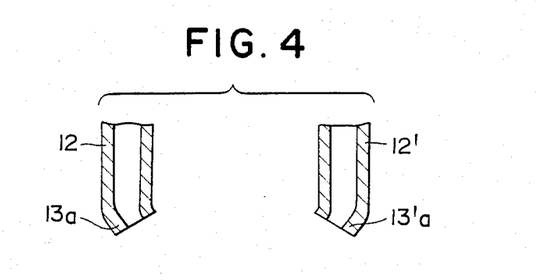
FIG. 4 is a longitudinal sectional view showing two convergent nozzles which are used in certain other embodiments of the device of the present invention for practicing certain other method embodiments.

The same experimental production of fine nickel—copper alloy powder was repeated, under the same conditions and parameters as described above, but this time using convergent nozzles 13 and 13'a as illustrated in sectional view in FIG. 4, instead of the convergent-divergent nozzles or Laval nozzles of the FIG. 2 apparatus. In this case, it was found that the range of the diameters of the particles of fine nickel—copper alloy powder produced was from about 130 to about 320 angstroms, while the average particle diameter was about 180 angstroms. Further, the variation of the particle diameters was found to be somewhat greater than in the case of using a convergent-divergent nozzle, described above. Also, the time taken for processing the total of 30 gm each of nickel and copper was slightly greater than in the case of the first preferred embodiment, being about 24 minutes, and thus there was a slight deterioration in the productivity of the process. Thus, it was found that the average particle diameter was greater, and the range of variation of particle diameter was also greater, in the case of using a convergent nozzle, than in the case of a convergent-divergent nozzle, and the productivity was worse; but still the quality and evenness of the fine nickel—copper alloy powder produced, and the productivity thereof, compared extremely favorably with conventional processes such as those described earlier in this specification with regard to the prior art.

EMBODIMENT TWO

Figure 3:
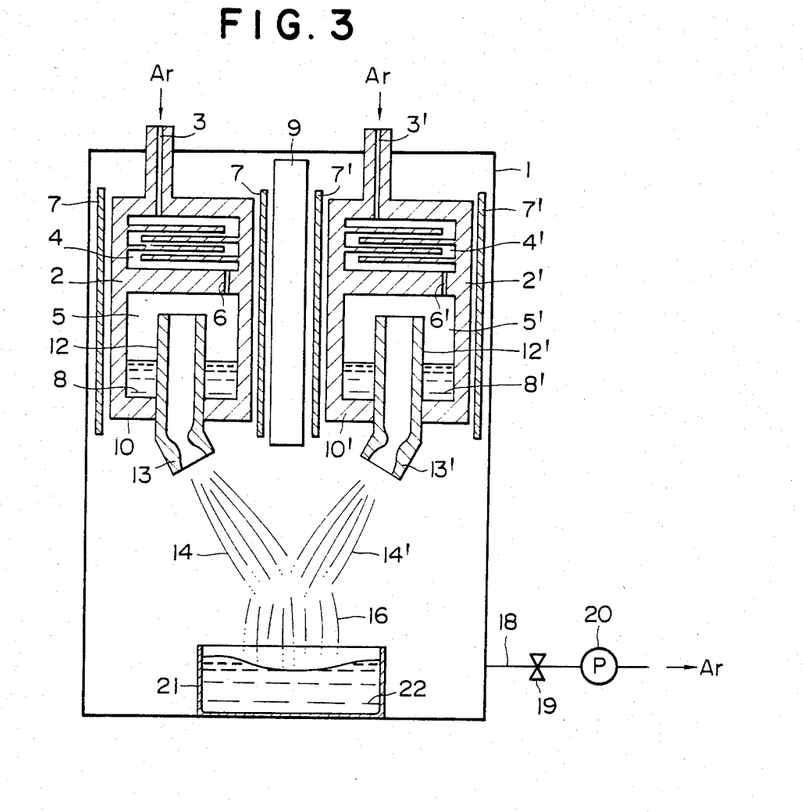
FIG. 3 is a similar schematic sectional view of an apparatus which is the second preferred embodiment of the device of the present invention, again incorporating two convergent-divergent nozzles, but this time incorporating an alloy powder collection oil bath, for making and collecting fine alloy powder according to certain other embodiments of the method of the present invention.

In FIG. 3, there is shown a schematic cross section of the second preferred embodiment of the device of the present invention, in a fashion similarly to FIG. 2 with respect to the first apparatus embodiment. In this figure, parts which are similar to parts of the first preferred embodiment shown in FIG. 2 and which have the same functions are denoted by the same reference numerals. This second preferred apparatus embodiment is substantially the same in construction as the first apparatus embodiment, except that instead of the collection plate 15 of the first preferred embodiment there is provided, for catching the fine alloy particles produced from the collision of the jet flows 14 and 14', a bath 21 adapted for receiving a quantity of oil 22, located below the point where the jet flows 14 and 14' impinge against one another, i.e. approximately midway between the nozzles 13 and 13' in the horizontal direction, and below them in the figure and displaced from them by a certain distance.

By using the device for making fine alloy powder shown in FIG. 3 and described above, fine nickel—copper alloy powder was made according to another preferred embodiment of the method of the present invention, as follows. First, a quantity 22 of approximately 500 cc of vacuum oil, which was of the type "Neovac M-200" (this is a trademark) made by Matsumura Sekiyu K. K., at an initial temperature of 20° C., was put into the oil bath 21, and then as before in the first embodiment a quantity of approximately 30 gm of metallic copper (99.9% Cu, balance impurities) was charged into the lower part of the metallic vapor production chamber 5 and a quantity of approximately 30 gm of metallic nickel (99.8% Cu, balance impurities) was charged into the lower part of the metallic vapor production chamber 5′, and then the temperature of the melting pot 2 and the chambers 4 and 5 defined therein was rapidly raised to a temperature $T_1$ of approximately 1650° C. by operating the heater 7 and the temperature of the melting pot 2′ and the chambers 4′ and 5′ defined therein was rapidly raised to a temperature $T_1'$ of approximately 2000° C. by operating the heater 7′, while steady flows of argon gas were introduced through the gas introduction ports 3 and 3′ into these two melting pots 2 and 2′. Thus the copper and the nickel in the metallic vapor production chambers 5 and 5′ were melted, and were further steadily boiled to produce copper vapor and nickel vapor respectively in the chambers 5 and 5′, these copper and nickel vapors mixing with the argon gas flows flowing into said chambers 5 and 5′. The mixture gases thus produced (in which the inert argon gas functioned as a carrier gas) then entered the upper ends of the conduits 12 and 12′ respectively, and passed down through said conduits 12 and 12′, to pass through the convergent-divergent nozzles 13 and 13′ respectively and each to be cooled at a very high rate by adiabatic expansion cooling caused by this expansion process, to respective estimated temperatures $T_2$ and $T_2'$ of again respectively about 500° to 690° C. and about 640° to 860° C. The jet flows 14 and 14′ expelled from the outlets of the convergent-divergent nozzles 13 and 13′ squirted into the alloy powder collection zone 11 and impinged together to form a combined flow 16, which was then directed downwards at the oil mass 22 in the oil bath 21. The vacuum pump 20 was operated at such an appropriate power, the valve 19 was so adjusted, and the flow rate of the argon gas introduced through the gas introduction port 3 was so controlled, as again to keep the pressures $P_1$ and $P_1'$ within the metallic vapor production chambers 5 and 5′ at approximately 10 torr, and the pressure $P_2$ within the alloy powder collection zone 11 at approximately 1 to 2 torr.

During this process, as before, the copper vapor and the nickel vapor in the mixture gas flows were condensed by this adiabatic expansion cooling, as being conjectured first into the liquid phase and then into the solid phase although this cannot be directly established, in the nozzles 13 and 13′, in the jet flows 14 and 14′, and in and around the zone 16, so as to form very fine nickel—copper alloy powder, and this alloy powder was then collected in a dispersed form in the oil mass 22, by colliding with the surface of said liquid oil mass 22 along with the inert argon carrier gas, and by becoming entrained in the oil mass 22 in dispersed form. The total time used for processing all the total of 30 gm each of nickel and copper charged into the chambers 5 and 5′ was about 17 minutes, and the range of the diameters of the particles of fine nickel—copper alloy powder produced was from about 70 to about 200 angstroms, while the average particle diameter was about 110 angstroms. Thus, it was found that even more fine nickel—copper alloy powder with particle diameters again even smaller than in the case of the first preferred embodiment described above, and with more evenly distributed particle diameters, and very much finer than nickel—copper alloy powder attainable in practice by conventional methods, was efficiently and practicably produced, according to this embodiment of the method of the present invention, by using the device shown. Also it was observed that the tendency of the produced nickel—copper alloy powder to agglomerate together was less than in the case of the first embodiment described, and no tendency was observed for the resultant powder to ignite when it was removed from the collection zone 11 and introduced into the atmosphere, thus showing that the intense surface activity of the particles thereof had been effectively neutralized by the action of the collecting oil mass 22

MODIFICATION TWO

The same experimental production of fine nickel—copper alloy powder was repeated, under the same conditions and parameters as described above, but this time using convergent nozzles 13 and 13′a as illustrated in sectional view in FIG. 4, instead of the convergent-divergent nozzles or Laval nozzles of the FIG. 3 apparatus. In this case, it was found that the range of the diameters of the particles of fine nickel—copper alloy powder produced was from about 90 to about 250 angstroms, while the average particles diameter was about 130 angstroms. Further, the variation of the particle diameters was found to be somewhat greater than in the case of using a convergent-divergent nozzle, described above. Also, the time taken for processing the total of 30 gm each of nickel and copper charged into the chambers 5 and 5′ was slightly greater than in the case described above, being about 24 minutes, and thus there as a slight deterioration in the productivity of the process. Thus, it was found that the average particle diameter was greater, and the range of variation of particle diameter was also greater, in the case of using a convergent nozzle, than in the case of a convergent-divergent nozzle, and the productivity was worse; but still the quality and evenness of the fine nickel—copper alloy powder produced, and the productivity thereof, were very good as compared with conventional processes.

EMBODIMENT THREE

The experiment detailed in Embodiment One above was repeated, but this time using the combination of aluminum and nickel, instead of copper and nickel, as the metals of which fine alloy powder was made. In detail, 30 gm of metallic aluminum (99.9% Al, remainder impurities) was charged into the metallic vapor production chamber 5 and 30 gm of metallic nickel (99.8% Ni, remainder impurities) was charged into the metallic vapor production chamber 5′, and then the melting pots 2 and 2′ and the chambers 4, 4′, 5, and 5′ defined therein were rapidly heated up to respective temperatures $T_1$ of approximately 1650° C. and $T_1'$ of approximately 2100° C. by operating the heaters 7 and 7′, while argon gas was introduced through the gas introduction ports 3 and 3′ in the same way as before. Thus the aluminum and the nickel were melted and were boiled to produce respectively aluminum and nickel vapor which mixed with the flows of argon gas and flowed out through the nozzles 13 and 13′ into the alloy powder collection zone 11. Again, the pressures $P_1$ and $P_1'$ within the metallic vapor production chambers 5 and 5′ was maintained, by proper operation of the vacuum pump 20, etc., both of approximately 10 torr, while this time the pressure $P_2$ within the alloy powder collection zone 11 was maintained at approximately 3 to 4 torr. And the estimated temperatures of the jet flows 14 and 14′ from the convergent-divergent nozzles 13 and 13′ were 900° to 1100° C. and 1150° to 1400° C., respectively.

The total time used for processing all the total of 30 gm each of aluminum and nickel charged into the chambers 5 and 5' was about 14 minutes, and the range of the diameters of the particles of fine aluminum—nickel alloy powder produced was from about 110 to about 260 angstroms, while the average particle diameter was about 150 angstroms. Thus, it was found that fine aluminum—nickel alloy powder with particle diameters very much finer than aluminum—nickel alloy powder attainable in practice by conventional methods, was efficiently and practicably produced, according to this embodiment of the method of the present invention, by using the device shown.

MODIFICATION THREE

The same experimental production of fine aluminum—nickel alloy powder was repeated, under the same conditions and parameters as described above, but this time using convergent nozzles 13 and 13'a as illustrated in sectional view in FIG. 4, instead of the convergent-divergent nozzles of the FIG. 2 apparatus. In this case, it was found that the range of the diameters of the particles of fine aluminum—nickel alloy powder produced was from about 140 to about 290 angstroms, while the average particle diameter was about 170 angstroms. Further, the variation of the particle diameters was found to be somewhat greater than in the case of using a convergent-divergent nozzle, described above. Also, the time taken for processing the total of 30 gm each of nickel and copper charged into the chambers 5 and 5' was slightly greater than in the case described above, being about 18 minutes, and thus there was a slight deterioration in the productivity of the process. Thus, it was found that the average particle diameter was greater, and the range of variation of particle diameter was also greater, in the case of using a convergent nozzle, than in the case of a convergent-divergent nozzle, and the productivity was worse; but still the quality and evenness of the fine nickel—copper alloy powder produced, and the productivity thereof, were very good as compared with conventional processes.

EMBODIMENT FOUR

The experiment detailed in Embodiment Three above using aluminum and nickel as the metals of which fine alloy powder was to be made was repeated, but this time using the apparatus of FIG. 3 which employed an oil bath for catching the aluminum—nickel alloy particles produced, instead of a collection plate. The parameters were the same as in the case of Embodiment Three, and the results were that the total time used for processing all the total of 30 gm each of aluminum and nickel charged into the chambers 5 and 5' was again about 14 minutes, and the range of the diameters of the particles of fine aluminum—nickel alloy powder produced was from about 80 to about 210 angstroms, while the average particle diameter was about 120 angstroms. Thus, it was found that fine aluminum—nickel alloy powder with particle diameters very much finer than aluminum—nickel alloy powder attainable in practice by conventional methods, was efficiently and practicably produced, according to this embodiment of the method of the present invention, by using the device shown; and that again use of an oil bath for collection of the fine alloy powder produced improved the fineness thereof.

MODIFICATION FOUR

The same experimental production of fine aluminum—nickel alloy powder was repeated, under the same conditions and parameters as described above, but this time using convergent nozzles 13 and 13'a as illustrated in sectional view in FIG. 4, instead of the convergent-divergent nozzles of the FIG. 3 apparatus. In this case, it was found that the range of the diameters of the particles of fine aluminum—nickel alloy powder produced was from about 110 to about 250 angstroms, while the average particle diameter was about 150 angstroms. Further, the variation of the particle diameter was found to be somewhat greater than in the case of using a convergent-divergent nozzle, described above. Also, the time taken for processing the total of 30 gm each of nickel and copper charged into the chambers 5 and 5' was slightly greater than in the case described above, being about 18 minutes, and thus there was a slight deterioration in the productivity of the process. Thus, it was found that the average particle diameter was greater, and the range of variation of particle diameter was also greater, in the case of using a convergent nozzle, than in the case of a convergent-divergent nozzle, and the productivity was again worse; but still the quality and evenness of the fine nickel—copper alloy powder produced, and the productivity thereof, were very good as compared with conventional processes.

Although the present invention has been shown and described with reference to the preferred embodiments thereof, and in terms of the illustrative drawings, it should not be considered as limited thereby. For example, the method and the device of the present invention could be adapted to the manufacture of fine powder of an alloy of more than two metals. In such a case, each of the metals would be vaporized in its own vaporization chamber such as the chambers 5 and 5' of the shown embodiments (which is necessary in order to heat each individual metal to its most appropriate individual vaporization temperature therefor), and would be blown out in vapor form, mixed with carrier gas, through its own nozzle; and all the flows from all the nozzles would be collided together in the alloy powder collection zone. Other variations are also possible. Therefore, various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A device for making fine alloy powder, comprising:
    a first vaporization chamber for producing vapor of a first metal in;
    first heating means for heating said first vaporization chamber;
    means for introducing a flow of inert gas into said first vaporization chamber;
    a first exit flow path from said first vaporization chamber, comprising a first nozzle therealong;
    a second vaporization chamber for producing vapor of a second metal in;
    second heating means for heating said second vaporization chamber;
    means for introducing a flow of inert gas into said second vaporization chamber;

a second exit flow path from said second vaporization chamber, comprising a second nozzle therealong;

and a powder collection zone into which the flows out from said first and said second nozzles are directed, said first and said second nozzles being so positioned that said flows out from them collide and combine in said powder collection zone; and means for evacuating gases from said powder collection zone.

2. A device according to claim 1, wherein said nozzles are convergent-divergent nozzles.

3. A device according to claim 1, wherein said nozzles are convergent nozzles.

4. A device according to claim 1, further comprising means for collecting alloy powder contained in said combined flows from said nozzles, said powder collecting means being located in said powder collection zone generally confronting the point of collision and combination of said flows from said nozzles.

5. A device according to claim 4, wherein said powder collecting means comprises a plate on which said combined flows from said nozzles impinge.

6. A device according to claim 5, wherein said plate is water cooled.

7. A device according to claim 4, wherein said powder collecting means comprises a bath filled with oil.

8. A method for making fine powder of an alloy of a first metal and a second metal, comprising the steps of:
producing vapor of said first metal;
mixing a flow of inert gas with said vapor of said first metal to produce a first mixture gas;
rapidly cooling said first mixture gas by adiabatically expanding it by passing it through a first nozzle;
producing vapor of said second metal;
mixing a flow of inert gas with said vapor of said second metal to produce a second mixture gas;
rapidly cooling said second mixture gas by adiabatically expanding it by passing it through a second nozzle;
colliding together output flows from said first nozzle and said second nozzle to produce a combined flow;
and collecting alloy powder from said combined flow.

9. A method according to claim 8, wherein said nozzles are convergent-divergent nozzles.

10. A method according to claim 8, wherein said nozzles are convergent nozzles.

11. A method according to claim 8, wherein said collection of alloy powder from said combined flow comprises the process of accumulating said alloy powder on a collecting plate.

12. A method according to claim 8, wherein said collection of alloy powder from said combined flow comprises the process of accumulating said alloy powder in an oil bath.

13. A method according to claim 8, wherein said first metal is copper, said second metal is nickel, and said alloy is copper—nickel alloy.

14. A method according to claim 8, wherein first metal is aluminum, said second metal is nickel, and said alloy is aluminum—nickel alloy.

* * * * *